United States Patent
Yu et al.

(10) Patent No.: US 9,895,853 B2
(45) Date of Patent: Feb. 20, 2018

(54) HOLOGRAPHIC STORAGE LAYER, HOLOGRAPHIC DISK USING THE SAME, AND METHOD FOR MANUFACTURING THE SAME

(71) Applicant: National Central University, Taoyuan (TW)

(72) Inventors: Yeh-Wei Yu, Taoyuan (TW); Ching-Cherng Sun, Taoyuan (TW)

(73) Assignee: National Central University, Taoyuan (TW)

(*) Notice: Subject to any disclaimer, the term of this patent is extended or adjusted under 35 U.S.C. 154(b) by 107 days.

(21) Appl. No.: 14/660,921

(22) Filed: Mar. 17, 2015

(65) Prior Publication Data
US 2016/0187848 A1 Jun. 30, 2016

(30) Foreign Application Priority Data
Dec. 26, 2014 (TW) .............................. 103145619 A

(51) Int. Cl.
*B29D 11/00* (2006.01)
*B29D 17/00* (2006.01)
*G03H 1/30* (2006.01)
*G11B 7/0065* (2006.01)

(52) U.S. Cl.
CPC ........ *B29D 11/0074* (2013.01); *B29D 17/005* (2013.01); *G03H 1/30* (2013.01); *G11B 7/0065* (2013.01); *G03H 2270/54* (2013.01)

(58) Field of Classification Search
CPC .... G03H 1/02; G03H 1/00; G03H 2001/0224; G03H 2225/00; G03H 2226/11; G03H 2260/60; G03H 2001/026; G03H 2001/263; G03H 2210/20; G03H 2210/30; G03H 2260/35; G03H 1/2294; G03H 359/03; G11B 7/0065; G11B 7/24044
See application file for complete search history.

(56) References Cited

U.S. PATENT DOCUMENTS

| | | | | |
|---|---|---|---|---|
| 5,487,926 A * | 1/1996 | Kuribayashi | .......... | G11B 7/256 369/13.39 |
| 5,827,593 A * | 10/1998 | Maruyama | ............ | B29C 45/263 369/275.4 |
| 5,876,823 A * | 3/1999 | Nagashima | ............. | B32B 37/12 369/275.1 |
| 6,108,297 A * | 8/2000 | Ohta | ................... | G11B 7/00718 369/275.1 |
| 6,322,933 B1 * | 11/2001 | Daiber | ..................... | G03H 1/30 369/103 |

(Continued)

FOREIGN PATENT DOCUMENTS

JP  S54131952 A  10/1979
JP  H04238124 A  8/1992

(Continued)

*Primary Examiner* — Jennifer L. Doak
(74) *Attorney, Agent, or Firm* — CKC & Partners Co., Ltd.

(57) ABSTRACT

A holographic storage layer includes a reflective structure and photosensitive units. The reflective structure is a grid-shaped structure and includes cavities. The photosensitive units are disposed in the cavities, in which each of the photosensitive units is surrounded by the reflective structure. First openings and second openings are defined by the reflective structure, and the photosensitive units are exposed by the first openings and the second openings respectively.

16 Claims, 10 Drawing Sheets

(56) References Cited

U.S. PATENT DOCUMENTS

| | | | | |
|---|---|---|---|---|
| 7,362,523 | B2* | 4/2008 | Takeyama | G03H 1/0252 156/598 |
| 8,937,641 | B1* | 1/2015 | Rikoski | H04N 5/89 348/40 |
| 2002/0135829 | A1* | 9/2002 | Edwards | G03H 1/02 359/3 |
| 2002/0135832 | A1* | 9/2002 | Edwards | G03H 1/26 359/29 |
| 2009/0080312 | A1* | 3/2009 | Sakamoto | G11B 7/00451 369/100 |
| 2009/0262408 | A1* | 10/2009 | Ogasawara | G11B 7/1374 359/30 |
| 2010/0259804 | A1* | 10/2010 | Buschbeck | G02B 6/001 359/34 |

FOREIGN PATENT DOCUMENTS

| | | |
|---|---|---|
| JP | H05217205 A | 8/1993 |
| JP | H07141694 A | 6/1995 |
| JP | 2005208426 A | 8/2005 |
| JP | 2005222591 A | 8/2005 |
| JP | 2005275264 A | 10/2005 |
| JP | 2006259271 A | 9/2006 |
| JP | 2009-99231 A | 5/2009 |
| JP | 2009122288 A | 6/2009 |
| JP | 2009145462 A | 7/2009 |
| JP | 4681002 B2 | 5/2011 |
| TW | 572216 | 1/2004 |
| TW | 200721153 A | 6/2007 |
| TW | 200735085 A | 9/2007 |
| WO | 2009028693 A1 | 3/2009 |

\* cited by examiner

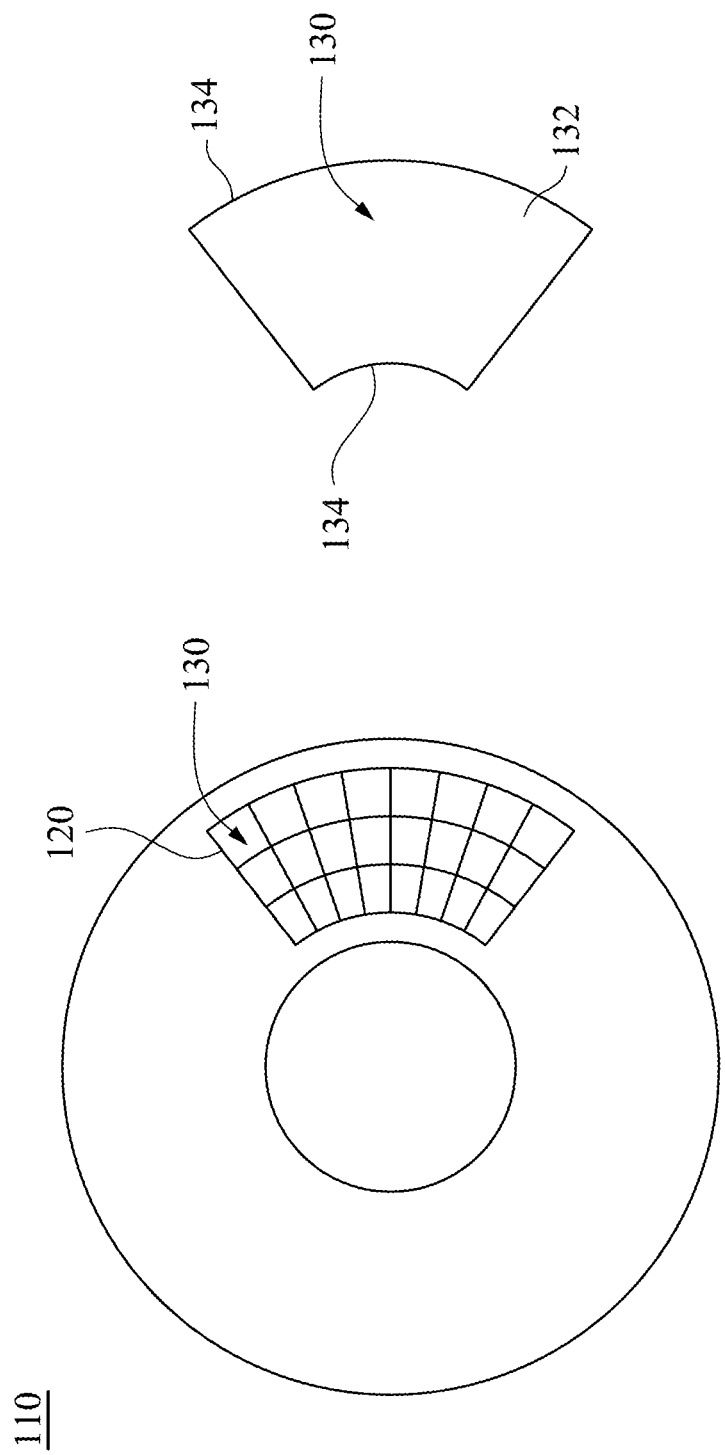

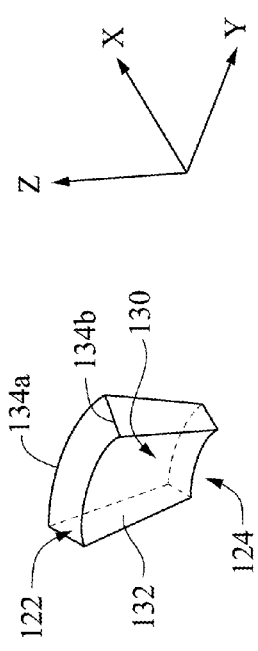
Fig. 5A
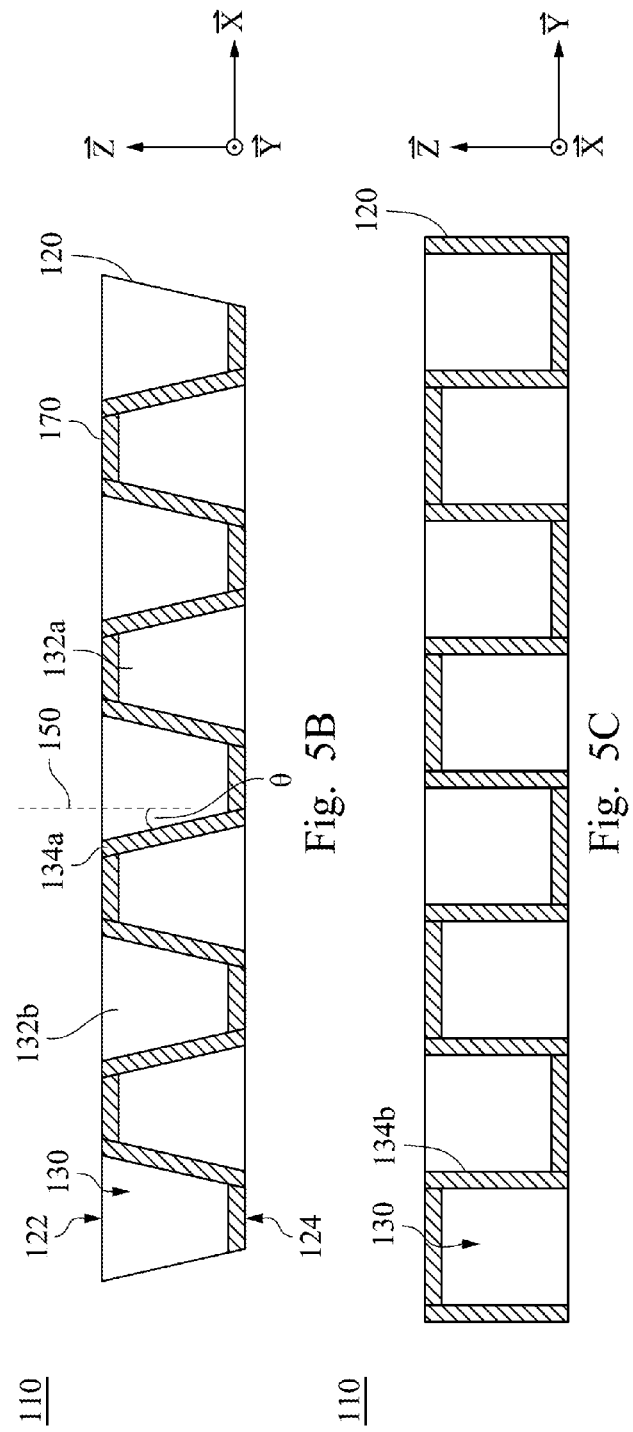
Fig. 5B
Fig. 5C

HOLOGRAPHIC STORAGE LAYER, HOLOGRAPHIC DISK USING THE SAME, AND METHOD FOR MANUFACTURING THE SAME

RELATED APPLICATIONS

This application claims priority to Taiwanese Application Serial Number 103145619, filed Dec. 26, 2014, which is herein incorporated by reference.

BACKGROUND

Technical Field

The present disclosure relates to a holographic storage layer, a holographic disk using the same, and a method for manufacturing the same.

Description of Related Art

With the development of technology, the amount of storage capacity required for electronic files has correspondingly increased. A typical way of storing data involves recording magnetic or optical changes on the surface of a recording medium, and the magnetic or optical changes are taken as the basis of the data. Examples of such recording mediums include floppy disks and compact discs. However, with continued increases in the amount of storage capacity required for electronic files, the development of holographic storage technology has been attracting the attention of those in the field.

With holographic storage technology, image data can be written into a recording medium (a photosensitive medium) via interference between a signal light beam and a reference light beam. When reading the image data, the image data can be generated by emitting the reference light beam into the recording medium (photosensitive medium) again. Next, the image data is generated, and the generated image data can be read by a detector. In other words, the storage capacity of holographic storage technology is related to the recording medium (photosensitive medium).

SUMMARY

An aspect of the present invention provides a holographic storage layer including a reflective structure, in which the reflective structure includes cavities for confining a diffusion area of a writing light beam. Therefore, when data is written into the holographic storage layer, the writing light beam formed by a reference light beam and a signal light beam is confined in a region defined by the cavities, such that the degree of mixing between the reference light beam and the signal light beam is enhanced. That is, a usage rate of photosensitive material in the cavities is increased.

An aspect of the present invention provides a holographic storage layer including a reflective structure and photosensitive units. The reflective structure is a grid-shaped structure and includes cavities. The photosensitive units are disposed in the cavities, in which each of the photosensitive units is surrounded by the reflective structure. First openings and second openings are defined by the reflective structure, and the photosensitive units are exposed by the first openings and the second openings respectively.

In some embodiments, an area of each of the first openings and the second openings is in a range from 0.1 $\mu m^2$ to 24 $mm^2$.

In some embodiments, the reflective structure is circular, and an arrangement of the cavities is symmetrical about a circle center of the reflective structure.

In some embodiments, the cavities are sector-shaped, in which each of the cavities includes two curved boundaries, and the curved boundaries and the reflective structure have the same circle center.

In some embodiments, an area of the photosensitive units exposed by the first openings or the second openings occupies a range from 50% to 99.9% of a total area of the holographic storage layer.

In some embodiments, at least one sidewall of each of the cavities and a normal direction of the holographic storage layer intersect at an angle.

In some embodiments, the angle is in a range from −45 degrees to 45 degrees.

In some embodiments, a first group of the photosensitive units is gradually widened from the corresponding first openings to the corresponding second openings, and a second group of the photosensitive units is gradually narrowed from the corresponding first openings to the corresponding second openings.

In some embodiments, the holographic storage layer further includes light-absorbing units disposed on a surface of the reflective structure, in which the light-absorbing units are located adjacent to the first openings and the second openings.

In some embodiments, the holographic storage layer further includes reflective units, in which the reflective units are disposed on the first openings corresponding to a first group of the photosensitive units and the second openings corresponding to a second group of the photosensitive units.

In some embodiments, the first group of the photosensitive units and the second group of the photosensitive units are arranged alternately.

In some embodiments, a shape of each of the cavities projected to a surface of the holographic storage layer is circular, rectangular, triangular, or polygonal.

In some embodiments, the holographic storage layer further includes sidewalls and at least one adhesive unit. The cavities are defined by the sidewalls. The adhesive unit is disposed between the sidewalls for fixing the sidewalls.

An aspect of the present invention provides a holographic disk including a first substrate, a second substrate, and a holographic storage layer. The holographic storage layer is disposed between the first substrate and the second substrate, and includes a reflective structure and photosensitive units. The reflective structure is a grid-shaped structure and includes cavities. The photosensitive units are disposed in the cavities, in which each of the photosensitive units is surrounded by the reflective structure. A plurality of first openings and second openings are defined by the reflective structure, and the photosensitive units are exposed by the first openings and the second openings respectively.

In some embodiments, the first substrate and the second substrate are transparent substrates.

In some embodiments, the first substrate is a transparent substrate and the second substrate is a reflective substrate.

An aspect of the present invention provides a method for manufacturing a holographic storage layer. The method includes a number of steps. Reflective layers are respectively formed on strip-shaped photosensitive substances. The photosensitive substances are arranged in a parallel arrangement for making the photosensitive substances into a bundle-shape configuration, in which a space between the reflective layers is filled with at least one adhesive unit to realize the bundle shape of the photosensitive substances. The photosensitive substances are cut, in which a cutting direction and a lengthwise direction of the photosensitive substances provided in the bundle-shape configuration are orthogonal.

An aspect of the present invention provides a method for manufacturing a holographic storage layer. The method includes a number of steps. A mold is filled with a reflective material and a reflective structure is formed by casting the reflective material, in which the reflective structure includes cavities. The cavities are filled with a photosensitive material, and then the photosensitive material is solidified.

In some embodiments, the method further includes planarizing the solid photosensitive material and the reflective structure.

BRIEF DESCRIPTION OF THE DRAWINGS

FIG. 4A is a top view of a holographic disk according to the third embodiment of this invention;

FIG. 4B is an enlarged view of a cavity in a reflective structure in FIG. 4A;

FIG. 5A is a perspective view of a holographic disk according to the fourth embodiment of this invention;

FIG. 5B is a side view of cavities arranged along a radial direction of a holographic disk according to the fourth embodiment of this invention;

FIG. 5C is a side view of cavities arranged along a tangent direction of a holographic disk according to the fourth embodiment of this invention;

DETAILED DESCRIPTION

Figure 1:
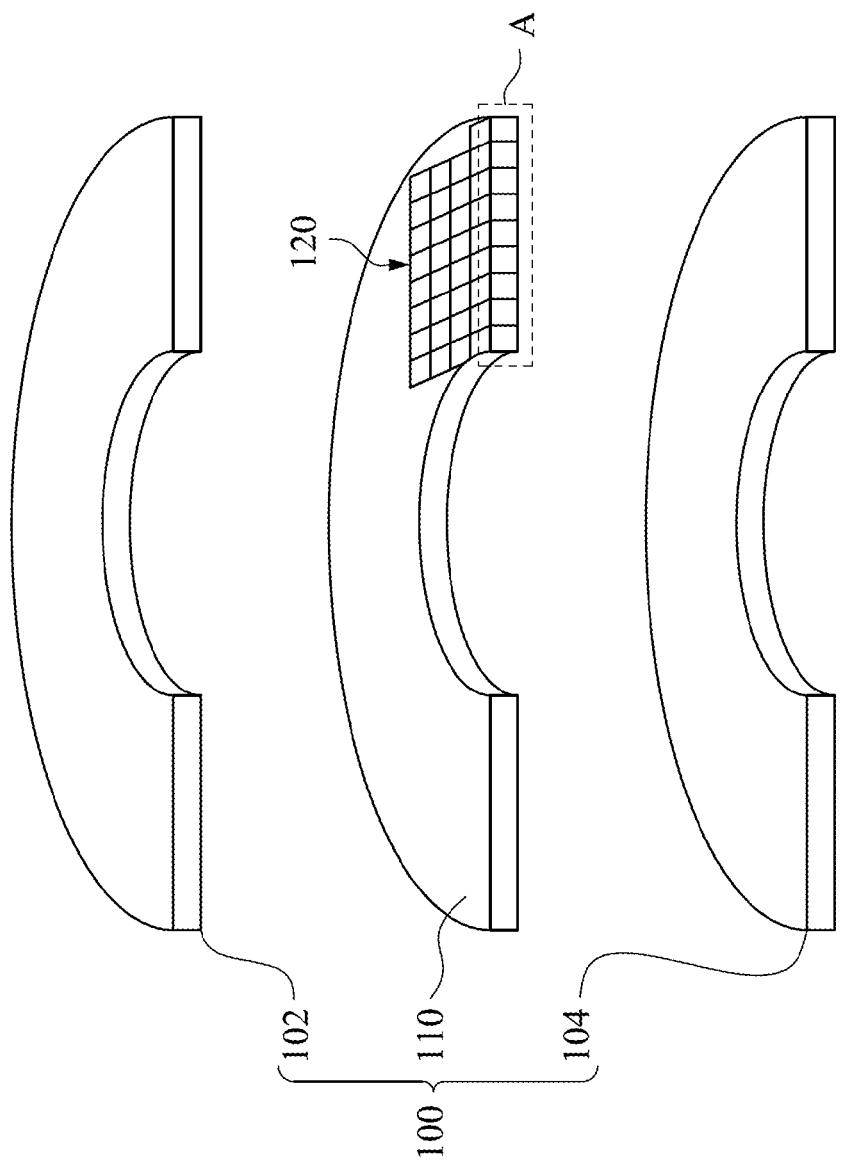
FIG. 1 is an exploded perspective view of a holographic disk according to the first embodiment of this invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In a holographic storage system, when data is written into a holographic disk, a writing light beam formed by a signal light beam and a reference light beam is required to perform exposure and interference in a certain area of a photosensitive unit. However, in the photosensitive unit, since the actual area used for storing data is smaller than the exposed area, parts of the photosensitive unit are not utilized, and hence a usage rate of the photosensitive unit is decreased. Moreover, when the usage rate of the photosensitive material is decreased, the storage capacity of the holographic disk is reduced.

In view of this, a holographic storage layer of the present invention includes a reflective structure, in which the reflective structure includes cavities for confining a diffusion area of a writing light beam. With the cavities of the reflective structure, when a light beam enters the holographic storage layer, the light beam is confined in a specific area, such that interference and exposure occur in this specific area. Therefore, the extent of mixing between a reference light beam and the signal light beam is enhanced, and the usage rate of the photosensitive material is increased. Moreover, since the usage rate of the photosensitive material is increased, the storage capacity of the holographic disk is also improved.

Figure 2:
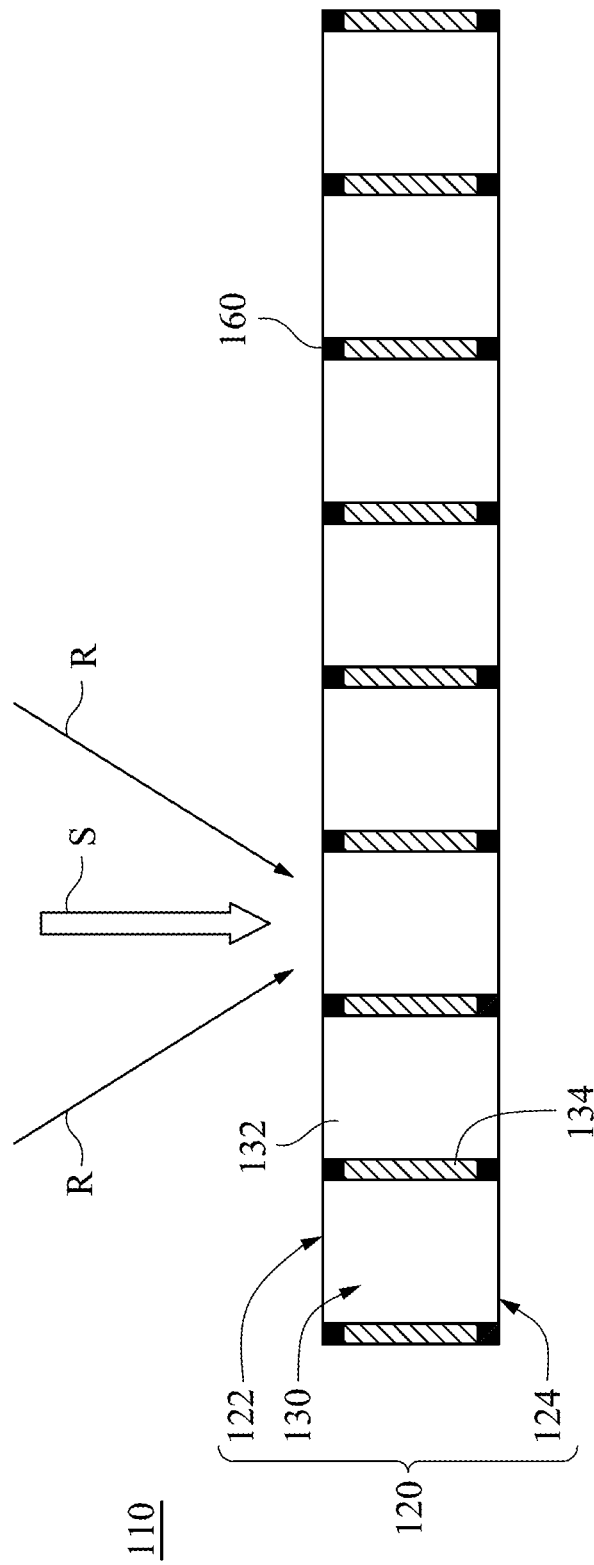
FIG. 2 is an enlarged view of area A in FIG. 1.

FIG. 1 is an exploded perspective view of a holographic disk according to the first embodiment of this invention. FIG. 2 is an enlarged view of area A in FIG. 1.

A holographic disk 100 includes a first substrate 102, a second substrate 104, and a holographic storage layer 110. The holographic storage layer 110 is disposed between the first substrate 102 and the second substrate 104 and includes a reflective structure 120 and photosensitive units 132. The reflective structure 120 is a grid-shaped structure and includes cavities 130. The photosensitive units 132 are disposed in the cavities 130, in which each of the photosensitive units 132 is surrounded by the reflective structure 120. First openings 122 and second openings 124 are defined by the reflective structure 120, and the photosensitive units 132 are exposed by the first openings 122 and the second openings 124 respectively.

As shown in FIG. 2, the reflective structure 120 includes sidewalls 134 to define each of the cavities 130, and the photosensitive units 132 located in the cavities 130 are separated from each other by the sidewalls 134. The photosensitive units 132 are made of an optical storage material or a photosensitive material. With this configuration, when a writing light beam formed by a signal light beam S and a reference light beam R enters one of the cavities 130, the writing light beam is reflected at the sidewalls 134 of the cavity 130. In other words, each of the cavities 130 is used for confining a diffusion area of the writing light beam, and the writing light beam is limited to the single cavity 130.

For example, when the holographic disk 100 is in a writing operation (or a reading operation), the writing light beam formed by the signal light beam S and the reference light beam R enters the cavities 130, and the photosensitive units 132 are interfered by the writing light beam. Since the writing light beam is limited to one of the cavities 130, the extent of mixing between the signal light beam S and the reference light beam R is enhanced. Therefore, the usage rate of the photosensitive unit 132 is increased, and the storage capacity of the holographic disk 100 is improved.

In some embodiments, the first substrate 102 is a transparent substrate and the second substrate 104 is a reflective substrate. Therefore, the writing light beam enters the holographic storage layer 110 through the first openings 122 facing the first substrate 102. As far as the signal light beam S and the reference light beam R entering the cavities 130 via the first openings 122 are concerned, when the signal light beam S and the reference light beam R leave the holographic storage layer 110 from the second openings 124, the signal light beam S and the reference light beam R are reflected from the second substrate 104 and returned to the holographic storage layer 110.

In addition, when the writing light beam enters the holographic storage layer 110 from a side of the first substrate 102, the first openings 122 are regarded as light entrances of the cavities 130 for the writing light beam, in which an area of each of the light entrances corresponds to a required minimum nyquist aperture of the writing light beam.

As far as the area of interference between the signal light beam S and the reference light beam R is concerned, the narrowest width of a distribution of the signal light beam S and the reference light beam R in the cavity 130 is in the range between one and two times the width of the minimum nyquist aperture. Therefore, the area of each of the first openings 122 regarded as the light entrance is greater than the area of the narrowest region of the cavities 130 interfered by the signal light beam S and the reference light beam R, such that the signal light beam S and the reference light beam R are not affected by the scale of the cavities 130 and can complete the writing operation. Limitations with respect to the nyquist aperture are described further below.

The nyquist aperture is determined by the following equation I:

$$D_v = (f\lambda)/\delta v \quad \text{Equation I}$$

where $D_v$ is the width of the aperture in the v direction, f is the focus of the focusing lens, $\lambda$ is the wavelength of the optical wave in the medium, and $\delta v$ is the minimum resolution of the signal in the v direction.

For example, assuming the holographic disk 100 is written by a spatial light modulator (SLM) with a 3.5 µm×3.5 µm pixel unit, and a light beam emitted by the SLM is passed through a relay lens, after the light beam is reduced by 3.5 times by the relay lens, an input signal with a 1 µm×1 µm resolution is generated on a front focal plane of an object lens, in which the focus of the object lens is 4 mm, and the wavelength of the light beam in the medium is 0.4 µm. According to equation I, in order for a light beam to be able to pass through the cavities 130, a focal plane of the object lens must have a 1.6 mm×1.6 mm aperture. In other words, under such conditions, the area of the light entrance of each of the cavities 130 is at least equal to or greater than 2.56 mm$^2$.

Moreover, as another example, assuming the light beam emitted by the object lens is a plane wave without modulation, the narrowest region of the light distribution is a light point with a diffraction limit, and thus $D_v$ is 0.61λ. Under such conditions, if the wavelength of the writing light beam is 0.4 µm, the area of the light entrance of each of the cavities 130 is at least equal to or greater than 0.244 µm$^2$.

Furthermore, the minimum area of the light entrance of each of the cavities 130 has to be such that all image data can be restructured. For example, even though the nyquist aperture is designed to allow the image data (the writing light beam) to pass therethough, in which the minimum area of the light entrance of each of the cavities 130 is between one and two times nyquist aperture in theory, the apertures of the cavities 130 can be further reduced by applying the run-length-limited code (RLL code). On the other hand, in the case where the input signal is two-level intensity or phase encoding, a distribution of the light field on the focal plane of the object lens is axially symmetric, and hence the apertures of the cavities 130 can be further reduced.

As previously described, the area of the light entrances of the cavities 130 corresponds with the need for the minimum nyquist aperture of the writing light beam. In different writing conditions (or different ways of writing), the light entrances of the cavities 130 may have different areas. Therefore, in order to correspond with such different ways of writing, in some embodiments, an area of each of the first openings 122 and the second openings 124 is in the range from 0.1 µm$^2$ to 24 mm$^2$.

Furthermore, since a percentage that the photosensitive units 132 occupying in the holographic storage layer 110 is highly related to the storage capacity of the holographic storage layer 110, in some embodiments, an area of the photosensitive units 132 exposed by the first openings 122 or the second openings 124 occupies a range from 50% to 99.9% of a total area of the holographic storage layer 110.

Here, if the area of the photosensitive units 132 occupies less than 50% of the total area of the holographic storage layer 110, the holographic storage layer 110 may have a low storage capacity. If, on the other hand, the area of the photosensitive units 132 occupies more than 99.9% of the total area of the holographic storage layer 110, a complex manufacturing process may be needed and the yield rate of the holographic storage layer 110 is decreased.

In some embodiments, the holographic storage layer 110 further includes light-absorbing units 160. The light-absorbing units 160 are disposed on a surface of the reflective structure 120, in which the light-absorbing units 160 are located at regions adjacent to the first openings 122 and the second openings 124. In other words, the surface of the reflective structure 120 corresponding to the sidewalls 134 is covered with the light-absorbing units 160. Therefore, when the writing light beam is emitted toward the holographic storage layer 110, if the writing light beam does not enter the first openings 122 or the second openings 124, the writing light beam is absorbed by the light-absorbing units 160. Furthermore, the reflective structure 120 can be filled with the light-absorbing units 160 during the manufacturing process of the reflective structure 120. Moreover, the light-absorbing units 160 also can be coated on the reflective structure 120 before the reflective structure 120 is filled with the photosensitive units 132. Therefore, after disposing the photosensitive units 132, the photosensitive units 132 and the light-absorbing units 160 are coplanar.

In other words, when the signal light beam S and the reference light beam R are emitted at a region out of the first openings 122 or the second openings 124, the signal light beam S and the reference light beam R are absorbed by the light-absorbing units 160, such that noise is reduced during the writing operation of the holographic storage layer 110. For example, as shown in FIG. 2, when the signal light beam S and the reference light beam R are emitted onto the surface of the holographic storage layer 110 corresponding to the sidewalls 134, the signal light beam S and the reference light beam R are absorbed by the light-absorbing units 160 so as to prevent the signal light beam S and the reference light beam R from being reflected from the surface of the sidewalls 134.

Figure 3:
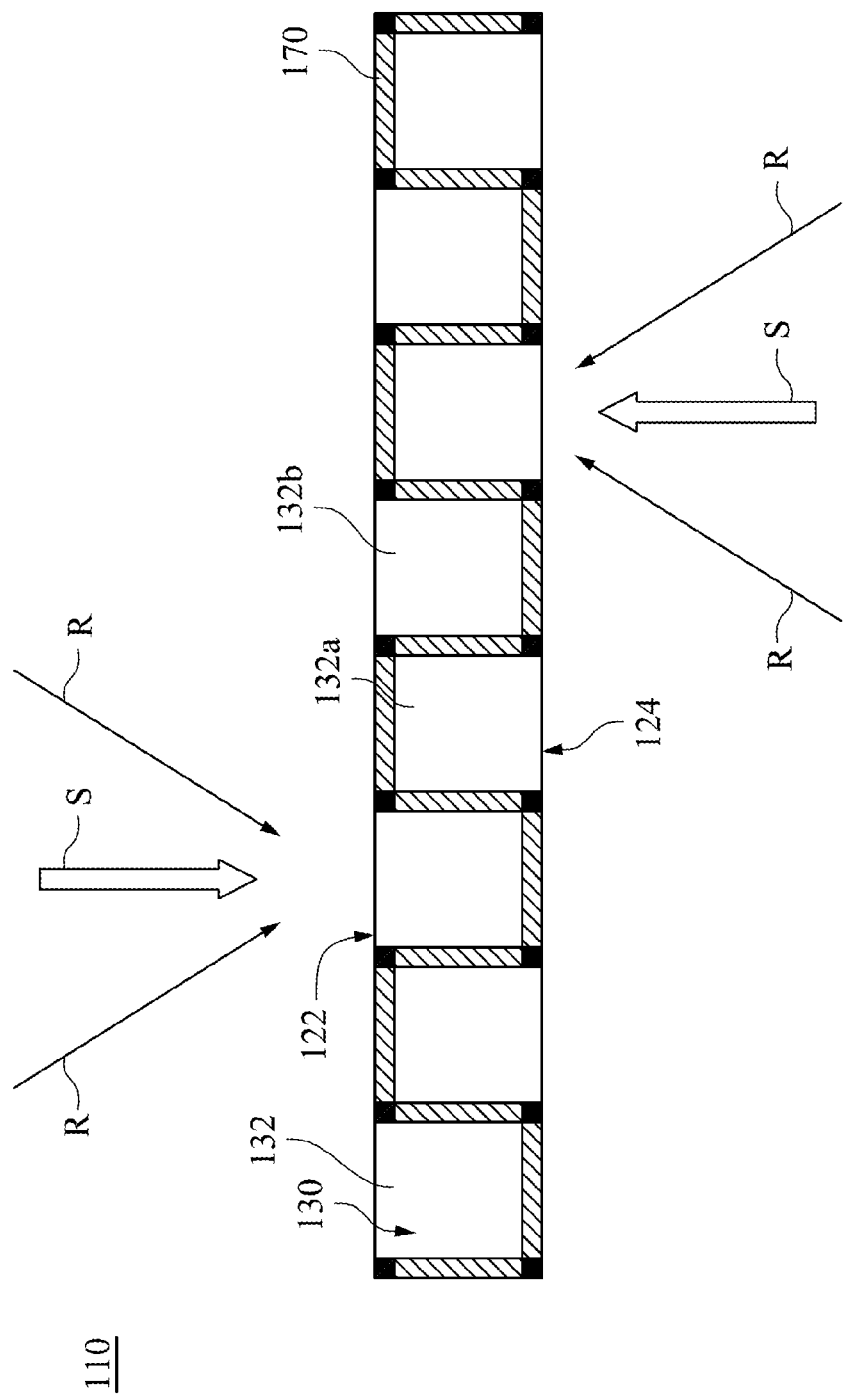
FIG. 3 is a side view of a holographic disk according to the second embodiment of this invention.

FIG. 3 is a side view of a holographic disk according to the second embodiment of this invention. As shown in FIG. 1 and FIG. 3, the difference between this embodiment and the first embodiment is that the holographic storage layer 110 of the holographic disk 100 further includes reflective units 170. The reflective units 170 are disposed on a portion of the first openings 122 and the second openings 124, such that each of the cavities 130 corresponding to the writing light beam has only one light entrance.

In some embodiments, the first substrate 102 and the second substrate 104 are transparent substrates. Therefore, the writing light beam can enter the holographic storage layer 110 not only via the first openings 122 facing the first substrate 102, but also via the second openings 124 facing the second substrate 104.

In the present embodiment, the photosensitive units 132 are divided into two groups, in which the photosensitive units 132a belong to a first group and the photosensitive units 132b belong to a second group. The reflective units 170 are disposed on the first openings 122 corresponding to the first group of the photosensitive units 132 (the photosensitive units 132a) and the second openings 124 corresponding to the second group of the photosensitive units 132 (the photosensitive units 132b). By disposing the reflective units 170 in this manner, the writing light beams propagated from the first substrate 102 and the second substrate 104 are respectively reflected at the positions corresponding to the photosensitive units 132a and the photosensitive units 132b. Therefore, the photosensitive units 132a receive the writing light beam propagated from the second substrate 104 via the second openings 124, and the photosensitive units 132b receive the writing light beam propagated from the first substrate 102 via the first openings 122.

Furthermore, the reflective units 170 can be formed simultaneously during the manufacture process of the reflective structure 170, such that the reflective units 170 and the photosensitive units 132 exposed by the first openings 122 or the second openings 124 are coplanar. Alternatively, the reflective units 170 also can be formed after disposing the photosensitive units 132, and the photosensitive units 132 and the reflective units 170 formed on the photosensitive units 132 are planarized together such that the reflective units 170 and the photosensitive units 132 are coplanar.

In this configuration, the writing light beam formed by the signal light beam S and the reference light beam R can be emitted toward the holographic disk 100 from the top and bottom sides of the holographic disk 100 simultaneously. In greater detail, the first group of the photosensitive units 132 (the photosensitive units 132a) receiving the writing light beam via the second openings 124 and the second group of the photosensitive units 132 (the photosensitive units 132b) receiving the writing light beam via the first openings 122 are arranged alternately.

FIG. 4A is a top view of a holographic disk according to the third embodiment of this invention. FIG. 4B is an enlarged view of a cavity in the reflective structure in FIG. 4A. The difference between this embodiment and the first embodiment is that the holographic storage layer 110 and the reflective structure 120 of the present embodiment are circular, and the cavities 130 in the reflective structure 120 are arranged following along an orbital path.

In the present embodiment, the holographic storage layer 110 and the reflective structure 120 are circular, and the arrangement of the cavities 130 is symmetrical about a circle center of the reflective structure 120. In other words, the cavities 130 of the reflective structure 120 are arranged following along an orbital path about a shared circle center of the holographic storage layer 110 and the reflective structure 120. Moreover, the cavities 130 are sector-shaped, in which each of the cavities 130 includes two curved boundaries. Similarly, the curved boundaries, the holographic storage layer 110, and the reflective structure 120 have the same circle center. That is, each of the cavities 130 includes two curved sidewalls 134, in which the two sidewalls 134 and the reflective structure 120 have the same circle center.

In this configuration, the cavities 130 of the reflective structure 120 are arranged with a higher density. Additionally, since the photosensitive units 132 are disposed in the cavities 130, the percentage of the photosensitive units 132 occupying in the holographic storage layer 110 is increased by this arrangement. Therefore, the storage capacity of the holographic storage layer 110 is improved. In the following description, arrangements are described that increase the density of the cavities 130 in the holographic storage layer 110.

FIG. 5A is a perspective view of a holographic disk according to the fourth embodiment of this invention. As shown in FIG. 5A, the difference between this embodiment and the third embodiment is that the first opening 122 and the second opening 124 corresponding to the same cavity 130 have different areas.

As previously described, the cavities 130 are sector-shaped when viewed from above. In order to arrange the cavities 130 with a higher density, the first opening 122 and the second opening 124 corresponding to the same cavity 130 have different areas, such that the cavities 130 and the photosensitive units 132 disposed in the cavities 130 are gradually widened or narrowed from the corresponding first openings 122 to the corresponding second openings 124. Furthermore, in this configuration, with respect to the two sidewalls 134 (see FIG. 4B) defining the cavities 130, an angle between these two sidewalls 134 and the surface of the holographic storage layer 110 (see FIG. 4A) is a non-right angle.

FIG. 5B is a side view of cavities arranged along a radial direction of a holographic disk according to the fourth embodiment of this invention. As shown in FIG. 5A and FIG. 5B, the cavities 130 of FIG. 5A and FIG. 5B have the same shape. To facilitate the description to follow, FIG. 5A and FIG. 5B are illustrated in the same cylindrical coordinate system with a radial direction X, a tangent direction Y, and an axial direction Z. Furthermore, and again to facilitate the description to follow, among the four sidewalls 134 corresponding to each of the cavities 130, two curved sidewalls 134 are marked as sidewalls 134a, and other two sidewalls 134 are marked as sidewalls 134b.

In some embodiments, at least one sidewall 134 of each of the cavities 130 and a normal direction 150 of the holographic storage layer 110 intersect at an angle θ, in which the angle θ is in the range from −45 degrees to 45 degrees. That is, the two sidewalls 134a of each of the sector-shaped cavities 130 are slanted to the surface of the holographic storage layer 110, in which these two sidewalls 134a are disposed along the radial direction X of the holographic storage layer 110. The other two sidewalls 134b of each of the sector-shaped cavities 130 and the surface of the holographic storage layer 110 are perpendicular, in which these two sidewalls 134b are disposed along the tangent direction Y of the holographic storage layer 110.

In this configuration, the photosensitive units 132 can be divided into two portions, in which the photosensitive units 132a belong to a first portion and the photosensitive units 132b belong to a second portion. The first portion of the photosensitive units 132 (the photosensitive units 132a) is gradually widened from the corresponding first openings 122 to the corresponding second openings 124, and the second portion of the photosensitive units 132 (the photosensitive units 132b) is gradually narrowed from the corresponding first openings 122 to the corresponding second openings 124.

Furthermore, the holographic storage layer 110 of the present embodiment further includes the reflective units 170, and the reflective units 170 are disposed at some of the first openings 122 and the second openings 124. The reflective units 170 of the present embodiment are similar to the reflective units 170 of the second embodiment. That is, the reflective units 170 are disposed at the first openings 122 corresponding to the photosensitive units 132a and the second openings 124 corresponding to the photosensitive units 132b. In other words, the holographic storage layer 110 of the present embodiment can receive the writing light beam from the top and bottom sides of the holographic storage layer 110 during the writing operation. Moreover, since the sidewalls 134a and the normal direction 150 of the holographic storage layer 110 intersect at the angle θ, the probability that the signal light beam S and the reference light beam R (see FIG. 2) are reflected at the sidewalls 134a is increased. Therefore, the extent of mixing between the signal light beam S and the reference light beam R is enhanced, and the storage capacity of the holographic storage layer 110 is improved.

FIG. 5C is a side view of cavities arranged along a tangent direction of a holographic disk according to the fourth embodiment of this invention. As shown in FIG. 5A and FIG. 5C, the cavities 130 of FIG. 5A and FIG. 5C have the same shape. To facilitate the description to follow, FIG. 5A and FIG. 5C are illustrated in the same cylindrical coordinate system with the radial direction X, the tangent direction Y, and the axial direction Z. Furthermore, the cavities 130 in FIG. 5C are arranged along the tangent direction Y.

As previously described, the two sidewalls 134b opposite the curved boundaries of the cavities 130 and the holographic storage layer 110 are perpendicular. Therefore, in the tangent direction Y, each of the sidewalls 134b between the cavities 130 and the surface of the holographic storage layer 110 are perpendicular, and the sidewalls 134b and the direction Z are parallel.

As a result, the cavities 130 of the reflective structure 120 of the present embodiment are arranged in a closely packed configuration, and the holographic storage layer 110 can receive the writing light beam (which includes the signal light beam and the reference light beam) propagated from the top and bottom sides of the holographic storage layer 110 under this arrangement. Furthermore, in the present embodiment, the two sidewalls 134a of the cavities 130 arranged along the radial direction X are slanted to the surface of the holographic storage layer 110, and the two sidewalls 134b of the cavities 130 arranged along the tangent direction Y and the surface of the holographic storage layer 110 are perpendicular. However, a person having ordinary skill in the art may choose a proper arrangement of the sidewalls 134. For example, the two sidewalls 134a of the cavities 130 with the curved boundaries and the surface of the holographic storage layer 110 may be perpendicular, and the other sidewalls 134b opposite the two sidewalls 134a may be slanted to the surface of the holographic storage layer 110.

FIG. 6A to FIG. 6D are top views of a reflective structure of a holographic disk according to various embodiments of this invention. In some embodiments, a shape of each of the cavities 130 of the reflective structure 120 projected to the surface of the holographic storage layer 110 and the reflective structure 120 is circular, triangular, rectangular, or polygonal (respectively illustrated in FIG. 6A, FIG. 6B, FIG. 6C, and FIG. 6D). Similarly, the cavities 130 are arranged in a closely packed configuration. Therefore, the usage rate of the photosensitive units 132 is increased, and the storage capacity of the holographic storage layer 110 is improved.

Figure 6B:
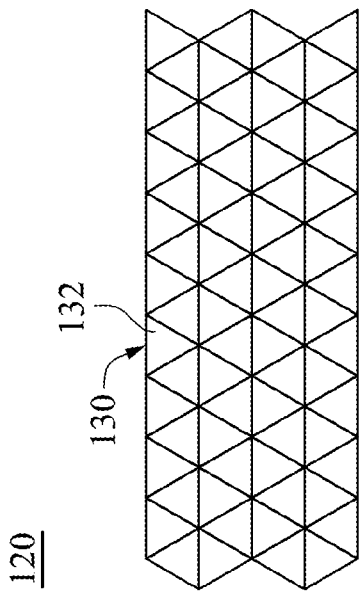
FIG. 6A to FIG. 6D are top views of a reflective structure of a holographic disk according to various embodiments of this invention.
Figure 6D:
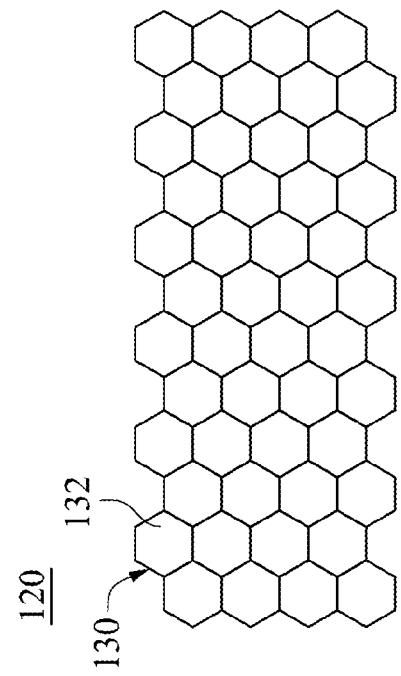
Figure 6A:
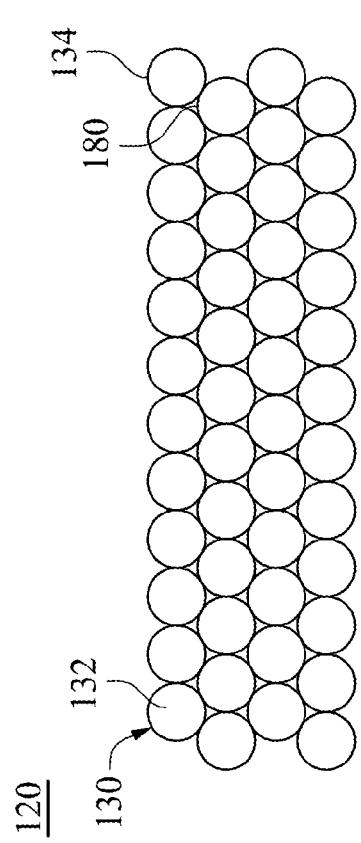
Figure 6C:
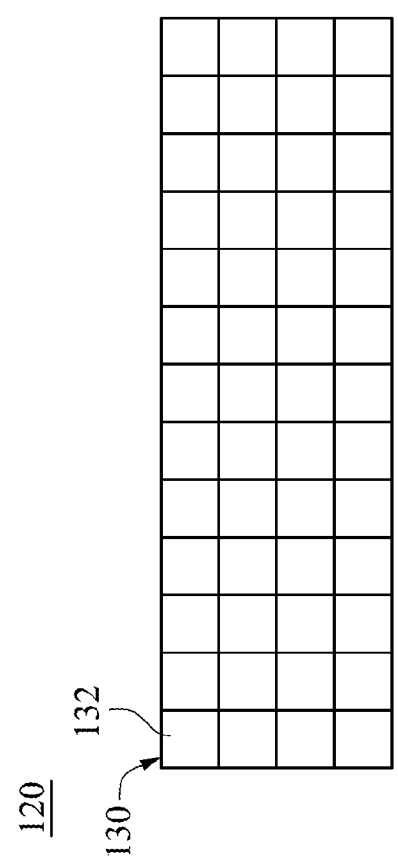

Furthermore, in some embodiments, the reflective frame structure 120 further includes sidewalls 134 and at least one adhesion unit 180. The cavities 130 are defined by the sidewalls 134. The adhesion unit 180 is disposed between the sidewalls 134 for fixing and connecting the sidewalls 134. As shown in FIG. 6A, each of the circular cavities 130 has the corresponding sidewall 134, and the adhesive unit 180 is disposed in a space between the sidewalls 134. After the sidewalls 134 are fixed, the reflective structure 120 formed by the sidewalls 134 is obtained. However, a person having ordinary skill in the art may choose a proper manner in which to form the reflective structure 120. For example, the sidewalls 134 of the reflective structure 120 may be formed in one piece.

FIG. 7A to FIG. 7D are perspective views of a method for manufacturing a holographic storage layer according to an embodiment of this invention. The method for manufacturing a holographic storage layer according to this embodiment includes a number of steps. First, reflective layers 190 are formed, in which the reflective layers 190 are formed respectively on the surfaces of strip-shaped photosensitive substances 192. Next, the photosensitive substances 192 are arranged in a parallel arrangement so that the photosensitive substances 192 are provided in a bundle-shape configuration, and a space between the reflective layers 190 is filled with at least one adhesion unit 180 to realize the bundle shape of the photosensitive substances 192. Subsequently, the photosensitive substances 192 are cut, in which a cutting direction and a lengthwise direction of the photosensitive substances 192 provided in the bundle-shape configuration are orthogonal. The above steps will be described in greater detail below.

Figure 7B:
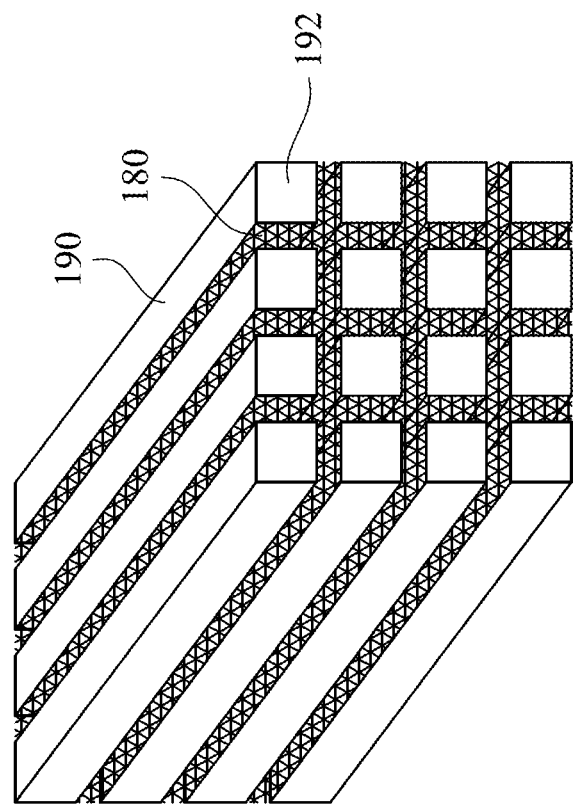
FIG. 7A to FIG. 7D are perspective views of a method for manufacturing a holographic storage layer according to an embodiment of this invention.
Figure 7A:
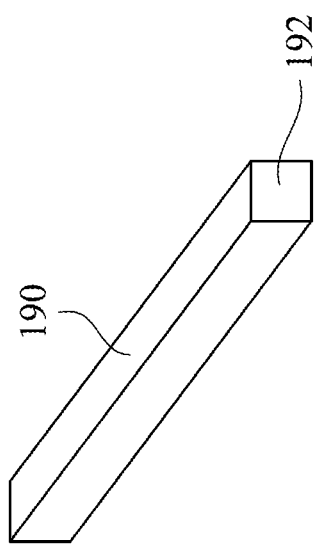

As shown in FIG. 7A, the photosensitive substance 192 is a bar made of an optical storage material or a photosensitive material. The reflective layers 190 are formed on the surfaces of the strip-shaped photosensitive substance 192, in which the reflective layers 192 can be formed by coating or vapor depositing reflective material.

As shown in FIG. 7B, the photosensitive substances 192 covered with the reflective layers 190 are arranged in a bundle-shape configuration or an array. Next, a space between the photosensitive substances 192 covered with the reflective layers 190 is filled with at least one adhesion unit 180, such that the photosensitive substances 192 covered with the reflective layers 190 are formed into the bundle-shape configuration.

Figure 7D:
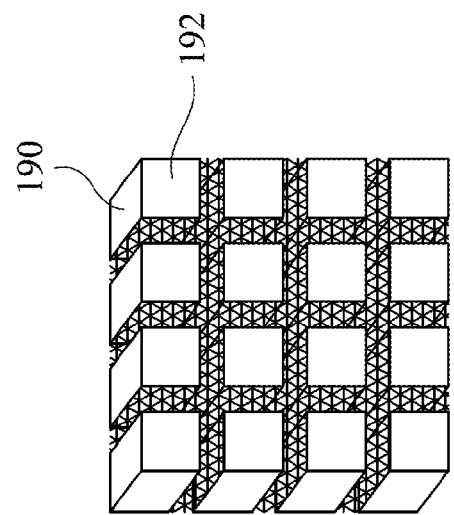
Figure 7C:
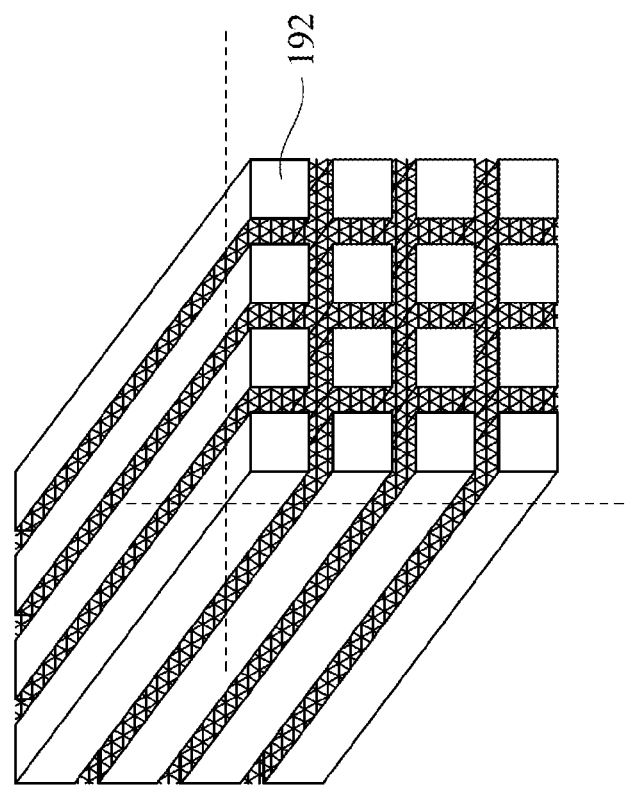

As shown in FIG. 7C, the photosensitive substances 192 formed into the bundle-shape configuration are cut, in which the cutting direction and the lengthwise direction of the photosensitive substances 192 provided in a bundle-shape configuration are orthogonal. That is, the photosensitive substances 192 are cut in a transverse direction. After cutting the photosensitive substances 192, the photosensitive substances 192 covered with the reflective layers 190 are formed into a sheet structure, as shown in FIG. 7D. Moreover, after burnishing this sheet structure, the reflective structure of the holographic storage layer in FIG. 1 is obtained.

FIG. 8A to FIG. 8G are side views of a method for manufacturing a holographic storage layer according to another embodiment of this invention. The method for manufacturing a holographic storage layer according to this embodiment includes a number of steps. A mold 196 is filled with a reflective material 194 and a reflective structure 120 is formed by casting the reflective material 194, in which the reflective structure 120 includes cavities 130. The cavities 130 are filled with photosensitive materials 200, and then the photosensitive materials 200 are solidified. Details of the above steps will now be described.

Figure 8A:
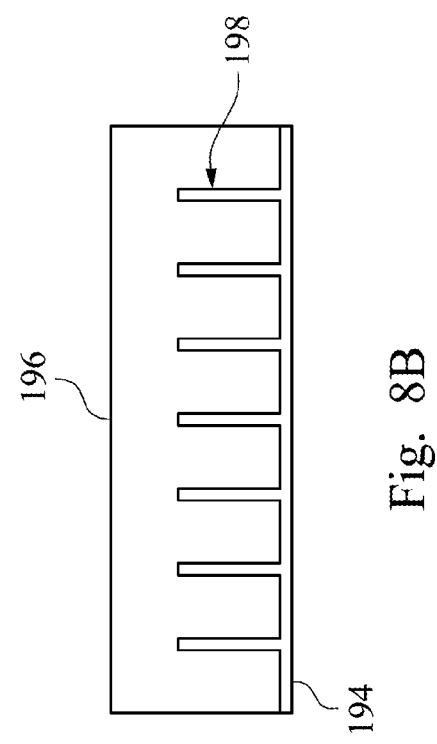
FIG. 8A to FIG. 8G are side views of a method for manufacturing a holographic storage layer according to another embodiment of this invention.

As shown in FIG. 8A, the mold 196 is filled with the reflective material 194, in which the mold 196 includes trenches 198. In addition, before the trenches 198 of the mold 196 are filled with the reflective material 194, the reflective material 194 can be heated in preparation for the casting process.

Figure 8B:
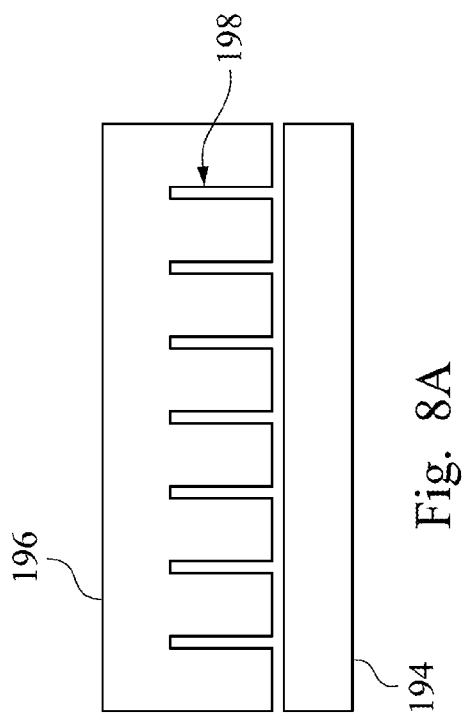

As shown in FIG. 8B, after the trenches 198 of the mold 196 are filled with the reflective material 194, the reflective material 194 permeates into the trenches 198. In order to improve the yield rate of the reflective material 194, this casting step can be performed under at least a low vacuum state, such that the air remaining in the mold 196 is reduced.

Figure 8C:
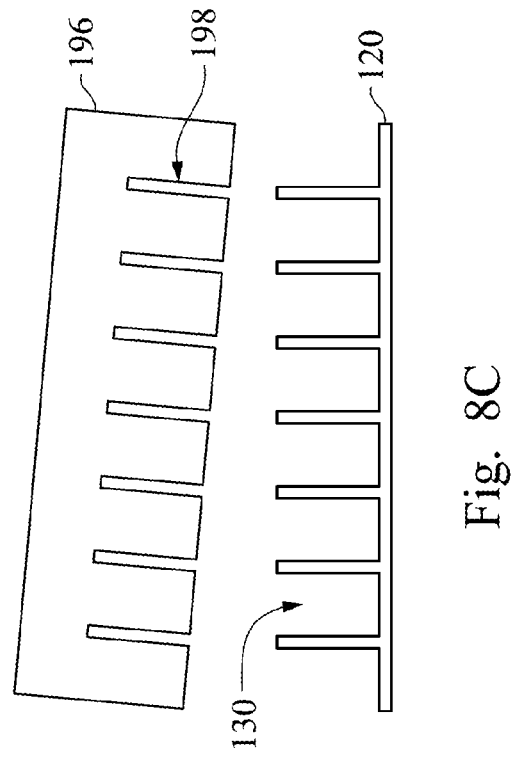

As shown in FIG. 8C, the reflective material 194 undergoes a demolding process, such that the reflective material 194 is separated from the mold 196 to form a reflective structure 120. Similarly, in order to improve the yield rate of the reflective material 194, this demolding process can be performed under a high vacuum state, such that an air-pressure difference between the air in the mold 196 and the external air is formed. The reflective material 194 can be easily taken out as a result of this air-pressure difference. Furthermore, the reflective structure 120 formed from the reflective material 194 includes the cavities 130 corresponding to the trenches 198.

Figure 8D:
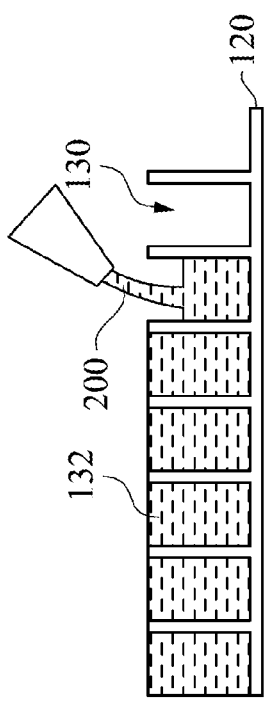
Figure 8E:
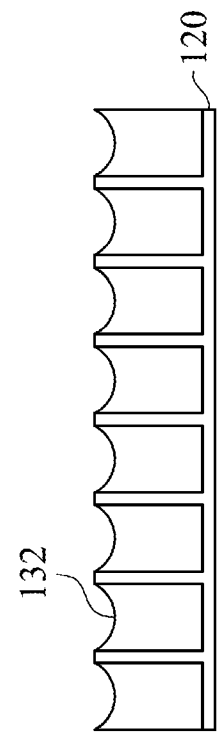

As shown in FIG. 8D and FIG. 8E, the cavities 130 of the reflective structure 120 are filled with the photosensitive materials 200, and the photosensitive materials 200 are solidified to form photosensitive units 132. In order to improve the yield rate of the photosensitive units 132, this step can be performed under a high vacuum state, such that the air remaining in the cavities 130 of the reflective structure 120 is reduced.

Figure 8F:
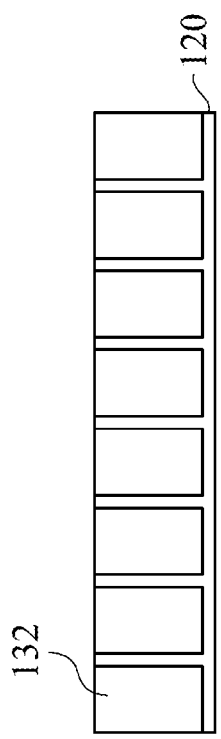

Furthermore, in some embodiments, the method further includes planarizing the solid photosensitive materials 200 and the reflective structure 120. In this case, if the vacuum state in the solidifying step is weak, the photosensitive materials 200 will be deformed due to undergoing shrinkage, and the surface of the photosensitive units 132 will not be level, as shown in FIG. 8F.

Figure 8G:
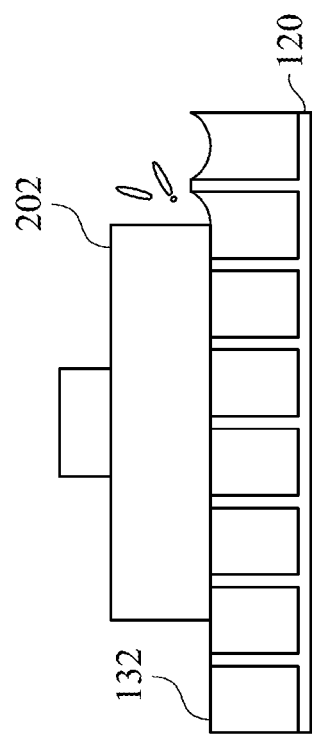

As shown in FIG. 8G, the photosensitive units 132 with the unlevel surface and the reflective structure 120 are planarized, in which the planarizing step includes burnishing or polishing the surfaces of the photosensitive units 132 and the reflective structure 120 by a burnisher 202.

By the above steps, the reflective structure 120 and the photosensitive units 132 located in the cavities 130 of the reflective structure 120 are formed, in which a combination of the reflective structure 120 and the photosensitive units 132 is similar to the holographic storage layer in FIG. 1.

As a result, the holographic storage layer of the present invention includes the reflective structure, in which the reflective structure includes cavities for confining the diffusion area of the writing light beam. When the holographic storage layer is in the writing operation, the interference and exposure occurring by the application of a writing light beam is confined in this area, such that the extent of mixing between a reference light beam and the signal light beam is enhanced. Therefore, with the cavities for confining the diffusion area of the writing light beam, the usage rate of the photosensitive material is increased, and the storage capacity of the holographic disk is also improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A holographic storage layer, comprising:
    a reflective structure, wherein the reflective structure is a grid-shaped structure and comprises a plurality of cavities; and
    a plurality of photosensitive units disposed in the cavities and made of an optical storage material, which is able to store data by interference and exposure to light and to allow light leaving therefrom to become diffracted light according to the data, wherein each of the photosensitive units is surrounded by the reflective structure, a plurality of first openings and a plurality of second openings are defined by the reflective structure, and the photosensitive units are exposed by the first openings and the second openings respectively.

2. The holographic storage layer of claim 1, wherein an area of each of the first openings and the second openings is in a range from 0.1 $\mu m^2$ to 24 $mm^2$.

3. The holographic storage layer of claim 1, wherein the reflective structure is circular, and an arrangement of the cavities is symmetrical about a circle center of the reflective structure.

4. The holographic storage layer of claim 3, wherein the cavities are sector-shaped, wherein each of the cavities comprises two curved boundaries, and the curved boundaries and the reflective structure have the same circle center.

5. The holographic storage layer of claim 1, wherein an area of the photosensitive units exposed by the first openings or the second openings occupies a range from 50% to 99.9% of a total area of the holographic storage layer.

6. The holographic storage layer of claim 1, wherein at least one sidewall of each of the cavities and a normal direction of the holographic storage layer intersect at an angle.

7. The holographic storage layer of claim 6, wherein the angle is in a range from −45 degrees to 45 degrees.

8. The holographic storage layer of claim 6, wherein a first portion of the photosensitive units is gradually widened from the corresponding first openings to the corresponding second openings, and a second portion of the photosensitive units is gradually narrowed from the corresponding first openings to the corresponding second openings.

9. The holographic storage layer of claim 1, further comprising a plurality of light-absorbing units disposed on a surface of the reflective structure, wherein the light-absorbing units are located adjacent to the first openings and the second openings.

10. The holographic storage layer of claim 1, further comprising a plurality of reflective units, wherein the reflective units are disposed on the first openings corresponding to a first group of the photosensitive units and the second openings corresponding to a second group of the photosensitive units.

11. The holographic storage layer of claim 10, wherein the first group of the photosensitive units and the second group of the photosensitive units are arranged alternately.

12. The holographic storage layer of claim 1, wherein a shape of each of the cavities projected to a surface of the holographic storage layer is circular, rectangular, triangular, or polygonal.

13. The holographic storage layer of claim 1, wherein the reflective structure further comprises:
    a plurality of sidewalls, wherein the cavities are defined by the sidewalls; and
    at least one adhesive unit disposed between the sidewalls for fixing the sidewalls.

14. A holographic disk, comprising:
    a first substrate;
    a second substrate; and
    a holographic storage layer disposed between the first substrate and the second substrate, comprising:
        a reflective structure, wherein the reflective structure is a grid-shaped structure and comprises a plurality of cavities; and
        a plurality of photosensitive units disposed in the cavities and made of an optical storage material, which is able to store data by interference and exposure to light and to allow light leaving therefrom to become diffracted light according to the data, wherein each of the photosensitive units is surrounded by the reflective structure, a plurality of first openings and a plurality of second openings are defined by the reflective structure, and the photosensitive units are exposed by the first openings and the second openings respectively.

15. The holographic disk of claim 14, wherein the first substrate and the second substrate are transparent substrates.

16. The holographic disk of claim 14, wherein the first substrate is a transparent substrate and the second substrate is a reflective substrate.

\* \* \* \* \*